(12) United States Patent
Belkhiria et al.

(10) Patent No.: US 7,398,606 B2
(45) Date of Patent: *Jul. 15, 2008

(54) PROCESS FOR THE PRODUCTION OF SAP

(75) Inventors: Sahbi Belkhiria, Chavornay (CH);
Pierre Alain Fleury, Ramlinsburg (CH);
Ibrahim Al-Alim, Riyadh (SA)

(73) Assignee: List AG, Arisdorf (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/526,540

(22) PCT Filed: Sep. 4, 2002

(86) PCT No.: PCT/EP02/09895

§ 371 (c)(1),
(2), (4) Date: Jul. 22, 2005

(87) PCT Pub. No.: WO2004/022608

PCT Pub. Date: Mar. 18, 2004

(65) Prior Publication Data

US 2006/0032081 A1    Feb. 16, 2006

(51) Int. Cl.
*F26B 5/05* (2006.01)
(52) U.S. Cl. .................................................. 34/407
(58) Field of Classification Search ............... 34/344, 34/360, 380, 381, 385, 407; 427/440; 118/726; 428/372, 907
See application file for complete search history.

(56) References Cited

U.S. PATENT DOCUMENTS

| 3,573,263 A | * | 3/1971 | Gill ........................... 526/217 |
| 4,138,539 A | * | 2/1979 | Landolt et al. ................ 526/93 |
| 5,891,254 A | * | 4/1999 | Coville et al. ................. 127/48 |

* cited by examiner

*Primary Examiner*—S. Gravini
(74) *Attorney, Agent, or Firm*—Bachman & LaPointe, P.C.

(57) ABSTRACT

A continuous process for the production of dried superabsorbent polymers (SAPs) the polymerization reaction is carried out either in an initially homogenous aqueous monomer solution (bulk aqueous solution polymerization) or in a heterogeneous water-in-oil reactant mixture (reverse phase suspension or emulsion polymerization) within a continuous closed polymerization reactor, then the resulting polymer gel is dried within a continuous moved bed in a closed dryer, avoiding the needs of standard intermediate maturity tank(s).

19 Claims, 1 Drawing Sheet

PROCESS FOR THE PRODUCTION OF SAP

Figure 1:
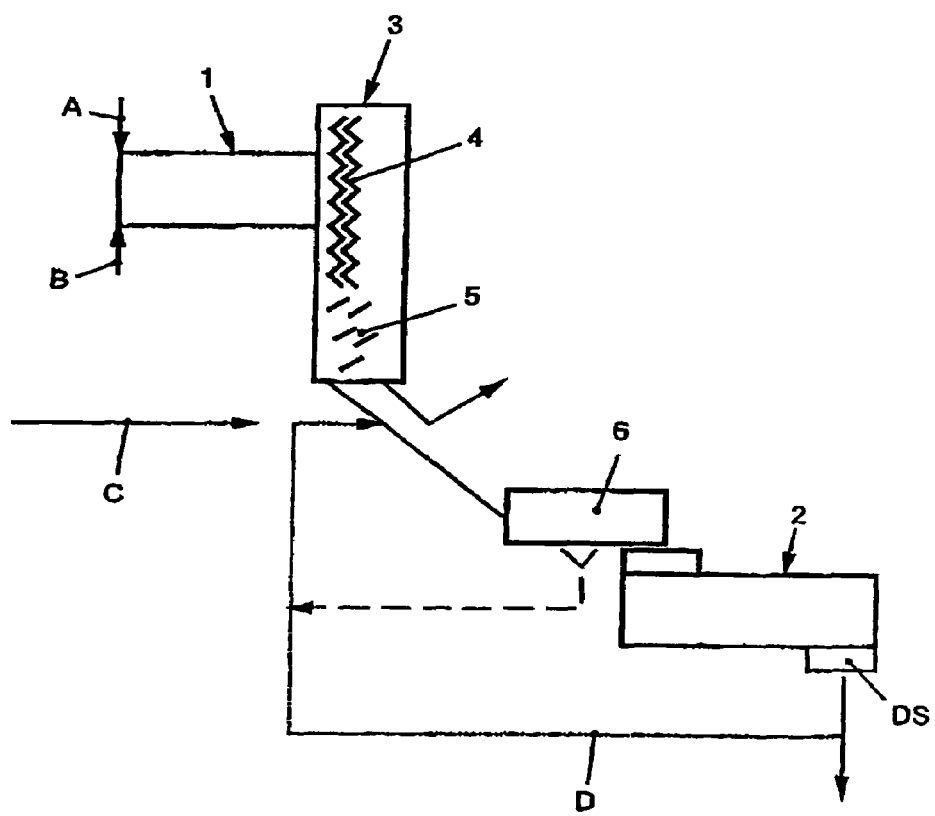

This Invention relates to an improved continuous process for the production of Superabsorbent Polymers, referred hereafter, as SAPs. More particularly, this invention relates to such process in which a continuous closed polymerisation reactor is combined with a continuous moved bed and closed dryer, avoiding the needs of standard intermediate maturity tank(s) and allowing condensing then recycling of residual reactants, additives and/or solvents.

INTRODUCTION

SAPs are polymers capable to absorb tens to several hundred times their own weight of liquid. Examples of liquids that could be absorbed are water, urine, blood, aqueous solutions of salts, fertilizers, pesticides, inks, etc.

SAPs are utilized in various applications that include personal care articles (diapers, napkins, etc.), agriculture, horticulture, transportation for perishable goods, fire fighting, communication cables, drug delivery, etc.

Polymerization

The polymerization reaction to produce SAPs can be carried out either in aqueous and initially homogenous phase (bulk solutions polymerization) or in water-in-oil and therefore heterogeneous phase (reverse emulsion or reverse suspension polymerizations). In this latter case, usually, the presence of at least one surfactant and/or other emulsion stabilizer(s) is necessary.

1. Bulk aqueous solution polymerization: An aqueous and homogenous reactant(s) mixture is initially prepared. Generally, water is the only solvent present in the mixture with a concentration between 15% and 90%. But the reaction could also be carried out in the presence of at least one additional solvent. As the polymerization is taking place, the reaction mixture becomes more and more viscous and a gelly SAP is progressively formed.
2. Reverse phase suspension or emulsion polymerizations (referred hereafter as Suspension Polymerization, for commodity): In these cases, two phases are present in the reaction mixture: An organic continuous phase and an aqueous discontinuous phase (droplets), in which the (co)monomers and other reactants and additives are dissolved. Generally, at least one suspending agent such as surfactants are usually used to stabilize the heterogeneous mixture. Compared to solution polymerization, the suspension polymerization leads to less viscous reaction media and better heat transfer.

For the abovementioned two ways, the polymerization is generally carried out under partial vacuum and/or mostly under inert condition, i.e. in the presence of inert gas.

Various types of reactants and materials can be utilized to obtain SAPs:

SAPs are generally produced by (co)polymerization of at least one water-soluble monoethylenically unsaturated monomer, and/or at least one waterinsoluble monoethylenically unsaturated monomer that can be totally or partly transformed to a water-soluble one by chemical modification(s), in the presence of at least one crosslinker, initiator, and, usually, other additives. These types of SAP are crosslinked networks of flexible polymer chains. Crosslinked poly(meth)acrylic acids and partially or totally neutralized poly(meth)acrylic acids, poly(meth)acrylamides and partial or total hydrolyzates of poly(meth)acrylamide, polyvinyl alcohol or poly(allylamines) are few examples of efficient SAPs.

Another way to produce SAPs is to allow the polymerization of at least one water-soluble monoethylenically unsaturated monomer(s) in the presence of at least one water-soluble, natural or synthetic, polymer (WSP) such as epoxide polymers, polysaccharides (ex. cellulose, starch, gums, etc.), polyvinyl alcohol and/or their derivatives. In this case the result is either a grafted, block or esterified SAP. In the reaction mixture, one may also add at least one crosslinker, other additives or a combination thereof. Polysaccharides-graft copolymers with acrylonitille, (meth)acrylic acids and their salts (meth)acrylamides and their hydrolyzates are some examples of that types of SAP.

Also another way to prepare SAP is to carry at least one modification on functional groups of already available natural or synthetic polymers. One modification consists on crosslinking branching, and/or grafting reactions or a combination thereof on at least one WSP. Another modification could be partial or total neutralization or hydrolysis of already crosslinking absorbent polymers.

Post-Treatment of SAPs

In various cases, the SAP, which is already transformed into gel crumbles or dried granulated, could also be post-treated (a post-treatment step). During this step, one or more reactants or additives such as water, SAP properties improved additives, surface crosslinker, initiators, or a combination thereof, are added to the SAP crumbles. The post-treatment could be effected in atmospheric, vacuum, or inert conditions and in the presence or absence of heating. The SAP may also be post-treated by heat, in atmospheric, vacuum or inert conditions without addition of any material.

The post-treatment step allows reaching one or more objectives for SAPs and/or process properties. One of the objectives to post-treat SAP is to increase the process efficiency such as recycling the dry SAP fines or allowing the reaction to proceed at higher conversion by holding the polymer for a longer time at higher temperature and/or adding additional initiators. Another objective of post-treatment is to improve one property or more of the SAP. Examples of such properties to be improved are gel strength (by increasing surface crosslinking), swelling capacity, absorption rate, stability to urine, salts and UV, rate of moisture absorption in humid environments, contents of residual monomers, contents of unwanted soluble polymers in SAP, degree of fines, etc.

EXAMPLE OF REACTANTS AND COMPONENTS FOR SAP PRODUCTIONS

Water-Soluble Monoethylenically Unsaturated Monomers

Any monomer, its salts, hydrolysats, derivatives or a combination thereof that is partly or totally miscible with water and that yields, after (co)polymerization, SAPs or polymers that can be transformed by hydrolysis or neutralization into SAPs.

Example of water-soluble monoethylenically unsaturated monomers used for preparing SAPs include α, β-ethylenically unsaturated carboxylic acid such as (meth)acrylic acid, maleic acid, maleic anhydride, fumaric acid, crotonic acid, citraconic acid, their esters (ex. (meth)acrylates of Methyl, ethyl, N-butyl, 2-hydroxyethyl, etc.), their N-substituted (alkyl)amides (ex. (meth)acrylamide, N-methyhlacrylamide, N-terbutylacrylamide, N,N-dimethylacrylamide, etc.), or their alkali metal and/or ammonium salts (ex. sodium (meth) acrylate, potassium(meth)acrylate, ammonium (meth)acrylate, etc.)

Other examples of water-soluble monoethylenically unsaturated monomers used for preparing SAPs include monomers containing nitrile group (ex. (meth)acrylonitrile, etc.), sulfo group (vinyl sulfonic acid, etc.), esters obtained by reaction of organic oxides (ethylene oxide, propylene oxide, etc.) or carboxylic acids with alcohols and there derivates.

Other examples of water-soluble monoethylenically unsaturated monomers used for preparing SAPs include (meth) acroleine, vinyl acetate, vinyl propionate, N-vinylpirrolidone, N-vinylformamide, N-vinycaprolactame and their derivatives.

A combination of two or more of the above-mention water-soluble monoethylenically unsaturated monomers and their derivatives can also be used.

Crosslinkers

Any type of organic crosslinking agent, inorganic crosslinking agent or a combination thereof that are already used for preparing SAPs.

Organic crosslinkers: molecules having two or more polymerizable double bonds per molecular unit. This includes diethylene, triethylene, propylene and neopentyl glycols; 1,4-butane diol; 1,5-pentane diol; 1,6-hexane diol; N,N'-methylene-bis-(meth)acrylamide; di(meth)acrylate of ethylene glycol; triallyl isocyanurate; tetra(meth)acrylates of pentaerythritol; trimetylol propane and pentaerythritol; and triacrylates of trimethacrylates of trimethylol propane and pentaerythrol.

Nonvinyl crosslinkers such as glycerol, polyethyleneglycols, ethyleneglycol diglycidyl ether and a combination thereof could also be used. Their combination with vinylic crosslinkers is also possible.

Inorganic crosslinkers: Examples of those agents are multivalent metallic cation solutions such as of Aluminium, Silicon, Titanium, Iron, etc.

One more of these Inorganic crosslinkers can be used in combination with one or more organic crosslinking agent.

Water-Soluble Polymers Used for Production of SAPs

Any natural or synthetic polymer or a combination thereof that is water-soluble or becomes partly or totally water-soluble after neutralization, hydrolysis, and/or other modifications(s) of their functional group(s) and that can be transformed to SAPs by crosslinking, grafting, blending, compounding, or a combination thereof. Examples of such polymers are poly(meth)acrylic acids, poly(meth)acrylate, poly(meth)acrylamide, Polysaccharides (ex. cellulose, starch, gums, alignates, etc.), epoxide polymers, Poly(meth) acrylonitrile, polyvinyl alcohol, etc.

Initiators: Any type of initiator or a combination thereof, preferably thermal or redox initiators.

Additives: Any additive or a combination of additives that can improve SAPs properties, composition, and/or process efficiency.

Surfactans: Any surfactant or combination of surfactants that is already used in suspension or emulsion polymerization to produce SAPs.

II. SAPs Production (Reaction and Drying)

A method for the continuous production of SAPs as describe in part I, which method comprises the continuous production of hydrated (resp. suspended) free-flowing gel particles of a given particle size, the eventual mixing of one or more additives for their post-treatment and/or improving their particles free-flowing properties, and the continuous drying of these free-flowing hydrated (resp. suspended) gel particles, wherein said dryer is characterized by a moved product-bed. For the bulk solution polymerisation, this method will replace the conventional moving belt reactors and dryers, wherein the product remains motionless on a moveable surface. For suspension polymerisation, the method allows the use of higher monomer concentrations while controlling efficiently the reaction and mixing parameters and conserving a good product quality.

SAPs Production in List Reactors

The production and processing of SAPs according to the description in paragraph I can be ideally and safely carried out in one of the continuous twin-shaft kneader reactors of the company List AG (ex. ORP-DP, CRP or CKR). For example, during the course of polymerization when a SAP is produced, the viscosity of the reaction mixture increases as a gel is formed. The intermeshing of the kneading elements, granulates this mass into small, uniform free-flowing gel particles, which are discharged at a conversion up to 90% or even more. Orientation angel of the kneading elements assures the axial conveying of the pasty polymer. The shape of kneading elements is an additional parameter to adjust the compression or shear between the intermeshing zones.

The reaction can be carried out at any pressure. Preferably, evaporative cooling can be used to remove the heat of reaction, especially when the autoacceleration of the reaction rate occurs (gel or Trommsdorff—Norrish effect). Depending on the degree of vacuum present into the reactor, approximately 0.5% to 40% or more of the water and/or other solvent(s) is evaporated to remove the high reaction heat of the monomers (ex.: ≅70 KJ/mol for the acrylates monomers). The condensed phase may contain traces or low concentrations of monomer(s) and additives. It may contain also surfactant(s) and/or other additives in the case of suspension polymerization. The evaporated water or liquid mixture can be condensed, eventually separated then totally (reflux) or partly recycled in the reaction mixture (evaporative cooling). Alternatively, it can also totally be removed to dry partially the produced SAP crumbles.

Continuous Kneader Reactor

The List Kneader Reactor is particularly very suitable to produce SAPs since it is designed to improve the radial/axial self-cleaning and axial conveying of viscous polymers, in addition to a good mixing during the reaction. Therefore, the system allows avoiding the complete filling/plugging of the reactor and the dead zones whilst working continuously. Torgue is very important to the compression zones, especially with regard to solid or gel particles. Since the SAP gels are very sensitive to the shear stress during their processing, this twin-shaft kneaders were optimized in order to avoid compression zones between the barrel and the kneading elements, and the intermeshing zones of the kneading elements. At these conditions, no significant presence of squeezed or destroyed gels was observed, but a good and uniform quality of SAPs.

The above and other objects and advantages of novel features of the present invention will become apparent from the following detailed description of a preferred embodiment of the invention illustrated in the accompanying drawing which shows a schema of the invention.

As illustrative example, the case of a bulk solution polymerisation to produce SAPs in considered.

Polymerization Reaction:

Reactants and catalysts will be fed in a twin-shaft kneading reactor 1 by arrow A together with air, vapor or inert gaz by arrow B.

The polymerization in solution or reverse phase suspension (or emulsion), as described in paragraph I, is conducted in the twin-shaft kneading reactor 1 (e.g. LIST-Reactor ORP-DP, CRP or CKR) in which the axial conveying is optimal and free flowing hydrated gel particles can be formed.

If, necessary, the gel particle size can be adjusted at the end of the twin shaft kneading reactor 1 and after discharge means 3 with a twin-screw 4 by means of adjustable knives 5. The cutting of the gel should be done at this wet stage (in vapor environment) in order to keep the cut particles free flowing. The particle size at this stage of the continuous process is very important because of the drying efficiency, which is improved while processing small particles (diffusion controlled). For example, SAPs particles of a diameter of 1 cm can be dried within 60 minutes or less at 180° C. and 30 mbar.

Air, vapor or inert gaz may be removed from the discharge means 3 after the knives.

Another possibility is the side discharge of free-flowing gel particles. In that case, a weir is then installed to regulate the fill level in the reactor. This option eliminates the needs of the discharge twin-screw.

Drying:

The SAP particles coming out of the twin-shaft kneading reactor 1 are already free-flowing particles because of the humidity and eventually the presence of other component(s) or a combination thereof acting as a lubricant(s) on the surface of particles.

Trying to dry these hydrated gel particles directly in a continuous moved-bed dryer 2 (e.g. rotary dryer, drum dryer, Discotherm dryer) results in a compactating of the hydrated gel particles because of the removing of the lubricant.

However, the mixing shown through arrow C of one or more appropriate additives or a combination thereof with the flow of hydrated gel particles coming out of the twin-shaft kneading reactor within a rotary mixer-tube 6 avoids the stickiness of the hydrated gel particles between each other while being separated from the superficial liquid film. These additives act as a free-flowing agent in the continuous dryer 2 wherein the product-bed is moved. The additive(s) could be in a powder or a liquid form, preferably as a powder. Examples of suitable additives or a combination thereof are kaolin, flour, talc, titanium dioxide, aluminium oxide, silica or the dried SAP fines D, which can be recycled at the end of the process and may be milled before being mixed as a free-flowing agent. However, any material or a combination of materials that are used in SAP post-treatments, as described in paragraph I, may also be employed as a free flowing agent while improving the polymer property, i.e. improved gel strength, absorption rate, reduced residual monomers, dust, etc. For SAPs used for agricultural and planting applications, liquid or powdery fertilizers, pesticides or a combination thereof, preferably in a powder form could be mixed with the hydrated gel particles and used as free-flowing agent during drying.

After the dryer 2 the dried SAPs are transferred to a not shown siever.

The foregoing pre-drying mixing process can be carried out at atmospheric pressure or in presence of inert gas and/or vacuum. The presence of vacuum is preferred. Also for adjustment, the process may operate under vacuum by using List or any other commercial periphery systems.

The new method of drying is innovative compared to the usual continuous belt convective dryer. Based on the dryer only, the financial impact is a considerable reduction of the drying investments when a moved-bed dryer is compared to a moving balt dryer wherein the product rests motionless on a movable surface. Moreover, by employing the moved-bad dryer 2, particularly List dryers, the use of maturity tanks can be avoided.

The drying process can be carried out independently or in combination (cf. FIG. 1) with a twin-shaft kneading reactor (e.g. List-Reactor ORP-PP. CRP or CKR), preferably in combination with the kneading reactor.

Each of the reactor 1 and the dryer 2 can be equipped with a condensing system. The discharge 3 includes a discharge twin-screw 4 and adjustable knives 5 system, and is inserted between the twin-shaft kneading reactor 1 and the dryer 2. If necessary, a pressure lock chamber 7 may also be inserted between the reactor and the dryer. The pressure lock chamber 3 is particularly important when the reactor 1 and the dryer 2 are functioning at different pressures. Any pressure lock chamber present on the market can be used. The List system and the rotary valve system are particularly suitable as pressure lock chamber.

The process described above consisting on using of either the reactor 1 or the dryer 2 or the combination thereof has the advantages to be more efficient economically and environmentally and fives an improved product's quality since it has the benefits of being more compact (lower space occupation), controlling better the reaction and drying parameters, avoiding the use of maturity tank(s), and giving the possibility to condense the evaporated solvents, and/or unreacted components then recycle them with larger recycling rate, which allows less residuals and gas wastes to be treated.

What is claimed is:

1. A continuous method for the production of dried superabsorbent polymers (SAPs) comprising:
   carrying out a polymerization reaction by continuously conveying reactants and catalysts in a closed continuous axially conveying polymerization reactor to form a polymer gel, wherein the polymerization reaction is selected from the group consisting of (1) bulk aqueous solution polymerization and (2) suspension polymerization;
   drying the resulting polymer gel in a closed dryer by continuously agitating the polymer gel by means of a continuously moved-bed of the polymer gel in the closed dryer; and
   discharging dried SAP fines.

2. A method according to claim 1, wherein the continuously moved-bed in the closed dryer comprises an agitated vessel having at least one agitating shaft, wherein the shaft is heated to increase the heat transfer and drying efficiency of the dryer.

3. A method according to claim 2, wherein drying of the polymer gel is carried out under at least one of the following conditions vacuum, heated air, inert gas, and steam.

4. A method according to claim 1, wherein maturity of the polymer is carried out in a first zone of the closed dryer.

5. A method according to claim 1, including mixing into at least one of the closed polymerization reactor and the closed dryer an additive selected from the group consisting of monomers, comonomers solvents, and mixtures thereof.

6. A method according to claim 1, including recycling to at least one of the closed polymerization reactor and the closed dryer dried SAP fines.

7. A method according to claim 1, including equipping at least one of the closed polymerization reactor and the closed dryer with condensing and recycling systems of residual reactants, solvents and additives.

8. A method according to claim 7, including operating the condensing and recycling systems in either in an independent or combined way.

9. A method according to claim 7, wherein the residual reactants, solvents and additives are at least partly recycled to at least one of the closed polymerization reactor and the closed dryer.

10. A method according to claim 1, wherein at least one of a pressure lock chamber and a gel cutting system is located between the closed polymerization reactor and the closed dryer.

11. A method according to claim 10, the pressure lock chamber is selected from one of a rotary valve and a piston lock system.

12. A method according to claim 10, including incorporating into a reaction mixture exiting the closed polymerization reactor, at least one of monomers, comonomers and solvents in the pressure lock chamber.

13. A method according to claim 10, including incorporating in the gel cutting system at least one of monomers, comonomers and solvents to a reaction mixture exiting the closed polymerization reactor.

14. A method according to claim 1, wherein the polymer gel leaving the closed polymerization reactor is mixed in a mixer with at least one additive for improving free-flowing properties before entering the closed dryer.

15. A method according to claim 14, wherein the closed polymerization reactor, the closed dryer and the mixer between them all operate at either the same pressure or different pressures.

16. A method according to claim 15, wherein the closed polymerization reactor, the closed dryer and the mixer between them operate under a vacuum.

17. A method according to claim 16, wherein the vacuum in the closed dryer is lower than the vacuum in the closed polymerization reactor and the mixer.

18. A method according to claim 17, wherein in which when the closed dryer is at a temperature higher than the closed polymerization reactor and mixer devices, the polymer gel in the closed dryer is flashed leading to intensive evaporation of solvents and un-reacted components and to higher drying efficiency of the SAP, wherein the flash allows the SAP particles to be more porous and thus have an increased liquid absorption rate.

19. A method according to claim 1, wherein the dried SAP fines exiting the closed dryer are partly cooled during their passage through a jacketed continuous discharge system.

* * * * *